Figure 1:
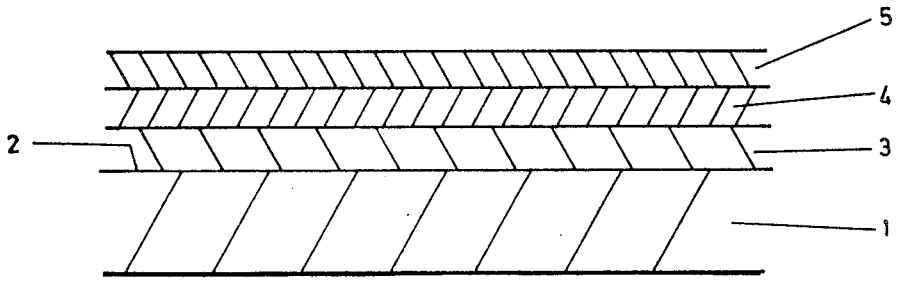
Figure 2:
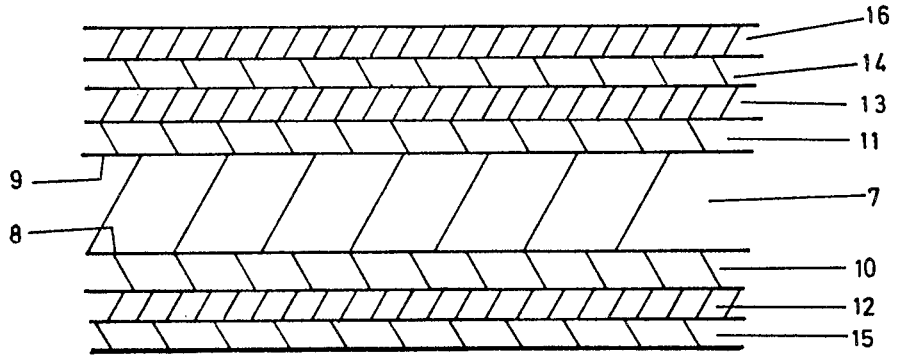
Figure 3:
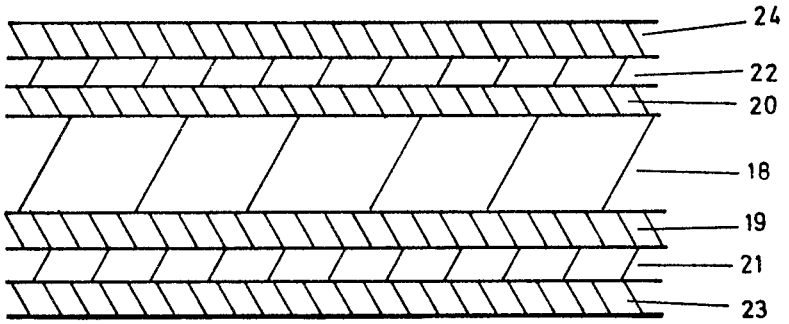
Figure 4:
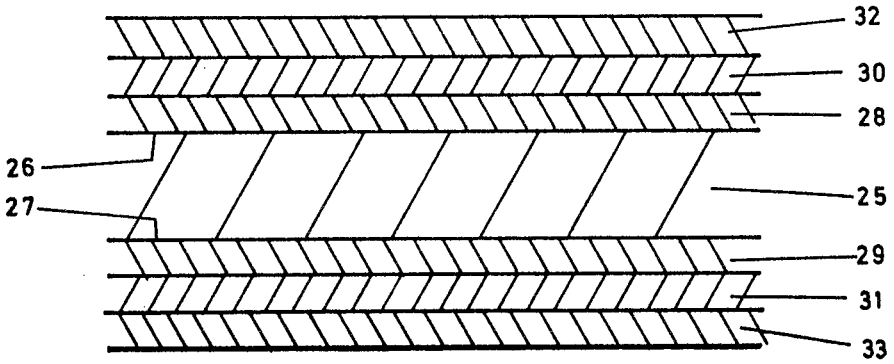

United States Defensive Publication [19] (H) [11] T955,003

Mann et al. [43] Feb. 1, 1977

[54] PHOTOGRAPHIC FILMS

[75] Inventors: David Roderick Mann, Colchester; Geoffrey Pickles Irvin, Brantham near Manningtree; Richard Silverwood, Wivenhoe, all of England

[73] Assignee: Imperial Chemical Industries Limited, London, England

[21] Appl. No.: 683,240

[22] Filed: May 4, 1976

Related U.S. Application Data

[63] Continuation of Ser. No. 548,221, Feb. 7, 1975, abandoned.

[30] Foreign Application Priority Data

Feb. 21, 1974 United Kingdom ..... 7871/74

[51] Int. Cl.[2] ..... G03C 1/78; G03C 1/96

[52] U.S. Cl. ..... 96/87 A

[57] ABSTRACT

Anti-static photographic films comprise a self-supporting synthetic plastics film base, such as a polyethylene terephthalate film, having superimposed on at least one side a gelatin-containing subbing layer and a radiation-sensitive layer superimposed on the gelatin layer, in which an anti-static material is included in the gelatin-containing subbing layer or being interposed as a layer between the gelatin-containing subbing layer and the radiation-sensitive layer, said anti-static material comprising a polymer or copolymer containing repeating units of the formula:

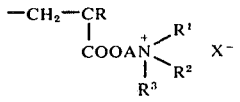

wherein R represents hydrogen or methyl, $R^1$ represents methyl or ethyl, $R^2$ and $R^3$ each independently represent methyl or ethyl or $R^2$ and $R^3$ taken together represent $—CH_2CH_2OCH_2CH_2—$ or $—(CH_2)_n—$ where $n$ represents 4, 5 or 6, A represents an alkylene or substituted alkylene group and $X^-$ represents a chloride or acetate ion, said polymer or copolymer having an average molecular weight in the range 5,000 to 2,000,000. Preferred anti-static materials include a copolymer of equimolar amounts of trimethyl-β-methacryloyloxyethyl ammonium chloride and styrene; a copolymer of equimolar amounts of ethyldimethyl-β-methacryloyloxyethyl ammonium bromide and methyl methacrylate; a copolymer formed from equimolar amounts of trimethyl-β-methacryloyloxyethyl ammonium acetate and styrene; a copolymer formed from 15 mole % trimethyl-β-methacryloyloxyethyl ammonium chloride and 85 mole % styrene; a copolymer formed from 50 mole % ethyldimethyl-β-methacryloyloxyethyl ammonium bromide and 50 mole % methyl methacrylate and a homopolymer of trimethyl-β-methacryloyloxyethyl ammonium chloride.

10 Claims, 2 Sheets Drawing,

27 Pages Specification

The file of this unexamined application may be inspected and copies thereof may be purchased (849 O.G. 1221, Apr. 9, 1968).